(12) United States Patent
Liao et al.

(10) Patent No.: US 8,380,477 B2
(45) Date of Patent: Feb. 19, 2013

(54) SYSTEM OF TESTING ENGINEERED SAFETY FEATURE INSTRUMENTS

(75) Inventors: Ben-Ching Liao, Taoyuan County (TW); Yuan-Chang Yu, Taoyuan County (TW); Huei-Wen Hwang, Taoyuan County (TW); Tsung-Chieh Cheng, Taoyuan County (TW); Minh-Huei Chen, Taoyuan County (TW)

(73) Assignee: Atomic Energy Council—Institute of Nuclear Energy Research, Lungtan, Taoyuan (TW)

( * ) Notice: Subject to any disclaimer, the term of this patent is extended or adjusted under 35 U.S.C. 154(b) by 542 days.

(21) Appl. No.: 12/684,194

(22) Filed: Jan. 8, 2010

(65) Prior Publication Data
US 2011/0173499 A1 Jul. 14, 2011

(51) Int. Cl.
*G06F 17/50* (2006.01)

(52) U.S. Cl. ............. 703/13; 703/3; 703/4; 703/14; 703/15; 702/108; 702/116; 702/117; 702/118; 702/120; 376/259; 376/245

(58) Field of Classification Search ............. 703/3–4, 703/13–18; 376/217, 259, 245; 702/108, 702/116, 117, 118, 120
See application file for complete search history.

(56) References Cited

U.S. PATENT DOCUMENTS

| | | | | | |
|---|---|---|---|---|---|
| 3,889,106 | A | * | 6/1975 | Alliston et al. | 703/18 |
| 4,783,307 | A | * | 11/1988 | Galligan et al. | 376/217 |
| 4,977,529 | A | * | 12/1990 | Gregg et al. | 703/18 |
| 2010/0080334 | A1 | * | 4/2010 | Sohn et al. | 376/217 |

OTHER PUBLICATIONS

Chung et al. Onboard Testing of the Control System in the LNG Carrier Using a Dynamic Simulator Simulation, vol. 78, Issue 2, Feb. 2002.*

Liao et al, Establishment of Engineered Safety Feature Instrumentation & Control Devices Automatic Testing Equipment, Sixth American Nuclear Society International Topical Meeting on Nuclear Plant Instrumentation, Control, and Human-Machine Interface Technologies, NPIC&HMIT 2009, Knoxville, Tennessee, Apr. 5-9, 2009, on CD-ROM, American Nuclear Society, LaGrange Park, IL (2009).

* cited by examiner

*Primary Examiner* — Saif Alhija
*Assistant Examiner* — Cuong Luu
(74) *Attorney, Agent, or Firm* — Jackson IPG PLLC

(57) ABSTRACT

The present invention certifies control modules of engineered safety feature instruments for a power plant automatically. The control modules can be tested before storing or operating. The test is done with enhanced testing speed and saved cost. Thus, safety of the control modules is confirmed.

16 Claims, 3 Drawing Sheets

SYSTEM OF TESTING ENGINEERED SAFETY FEATURE INSTRUMENTS

FIELD OF THE INVENTION

The present invention relates to testing engineered safety feature (ESF) instruments; more particularly, relates to testing the engineered safety feature instruments with enhanced testing speed and confirmed safety of control modules automatically and effectively before storing or operating.

DESCRIPTION OF THE RELATED ART

Instrument control system of a power plant is digitalized, called distributed control and information system (DCIS). However, suppliers of components of the control system are a lot and system interfaces are complex. Testing signals for module testing devices or control card testing devices of Safety System Logic and Control/Engineered Safety Feature (SSLC/ESF) in the control system are generated manually; and various signals require various signal generators. During testing, test parameters are modified manually; test results are recorded with pens and papers; and then the results are verified manually. All these take time and effort and human errors may quite often happen. Hence, the prior art does not fulfill all users' requests on actual use.

SUMMARY OF THE INVENTION

The main purpose of the present invention is to test engineered safety feature instruments automatically.

The second purpose of the present invention is to effectively certify the control modules of the engineered safety feature instruments in a limited time with human resource and cost saved.

The third purpose of the present invention is to test the control modules with testing speed enhanced and safety of the control modules confirmed.

The fourth purpose of the present invention is to simulate various inputs of the control modules and detect outputs of the control modules for certifying the control modules.

To achieve the above purposes, the present invention is a system of testing engineered safety feature instruments, comprising a control devices cabinet, a signal terminal block, a programmable signal simulating and detecting (S/D) device, a simulation controlling and verifying (C/V) device and a communication network, where the control devices cabinet holds a plurality of Engineered Safety Feature control modules; the signal terminal block is a transit terminal for relaying input/output signals of hard points of the control modules; the programmable signal S/D device generates specific simulating signals and receives specific detected signals; the simulation C/V device controls the programmable signal S/D device for generating the simulating signals and receiving the detected signals and then verifies the detected signals; the communication network is a media on which the control device cabinet and the simulation C/V device communicates; every node on the communication network interchanges information with each other; and detected signals returned from the control modules are received and verified to certify the control modules. Accordingly, a novel system of testing engineered safety feature instruments is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
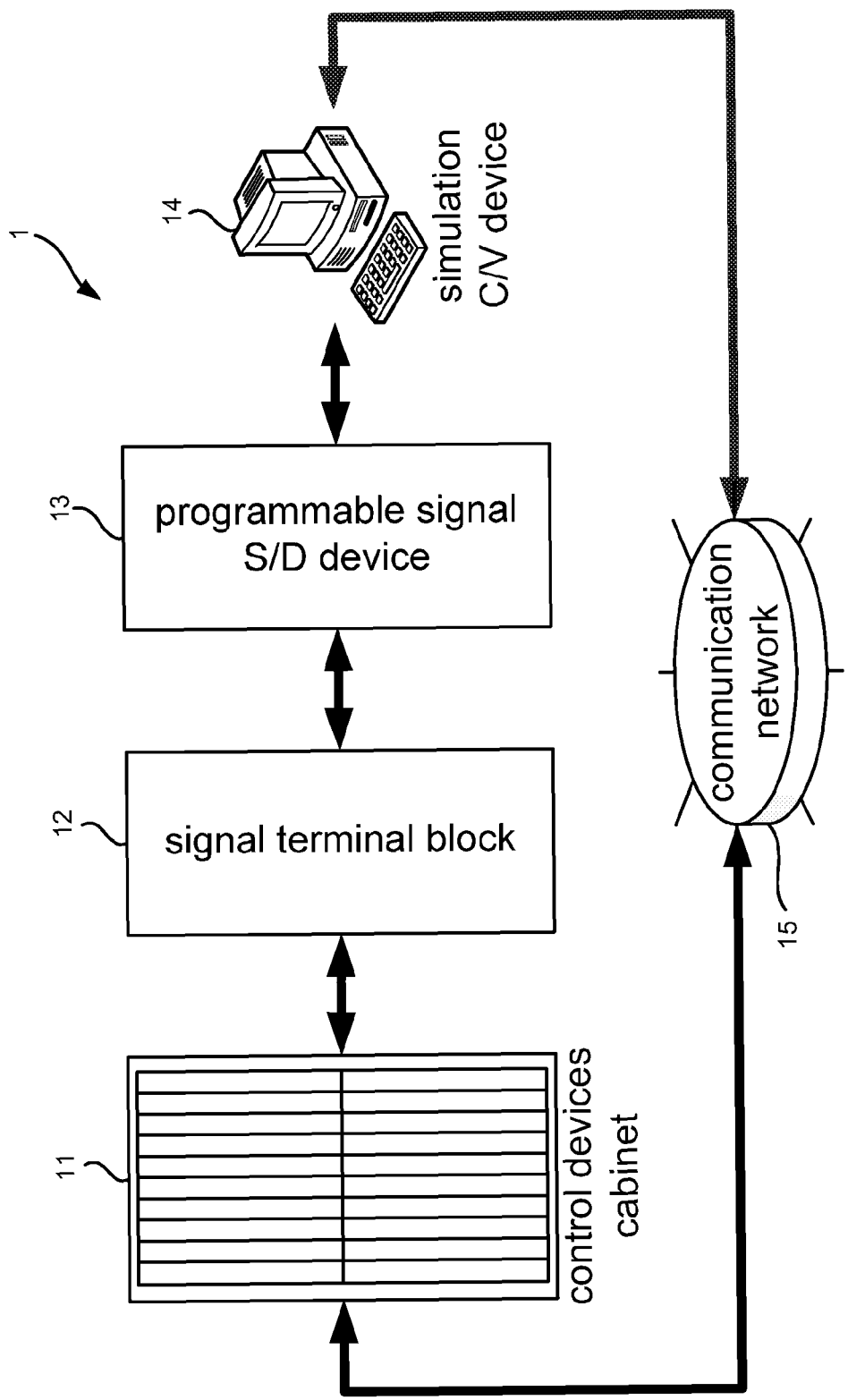
FIG. 1 is the structural view showing the preferred embodiment according to the present invention.

Please refer to FIG. 1, which is a structural view showing a preferred embodiment according to the present invention. As shown in the figure, the present invention is a system of testing engineered safety feature instruments, comprising a control devices cabinet 11, a signal terminal block 12, a programmable signal S/D device 13, a simulation C/V device 14 and a communication network 15, where a time for testing control modules is shortened with functions of the control modules verified.

The control devices cabinet 11 holds a plurality of engineered safety feature instruments; and comprises a communication module and a plurality of control modules. The communication module provides a communication interface between the control modules of the engineered safety feature instruments and the communication network 15. Each control module is a node on the communication network 15; and every node interchanges information with each other through the communication network 15. The information interchanged between these nodes are control signals and status signals. The control module has an independent control circuit to provide logic control of signals. When signals enter into the control modules, related safety controls are done through the independent control circuits of the control modules.

The signal terminal block 12 is a transit terminal, which can be a hardware terminal block, for relaying input/output signals of hard points of the control modules. Regarding signals inputted into the control modules, signals are relayed by the signal terminal block to connect to inputs of the control modules. Regarding signals outputted from the control modules, signals are outputted from the control modules to drive relays in the signal terminal block 12, where those relays are functioned as switches of outside devices. Or, signals are outputted from the control modules to be directly sent through the signal terminal block 12 to be source signals for driving those outside devices.

The programmable signal S/D device 13 generates specific simulating signals and receives specific detected signals, where each of the simulating signals and the detected signals can be a current, a voltage or a resistance; or even a switch-on or switch-off signal.

The simulation C/V device 14 has a program for controlling and verifying, where the programmable signal S/D device 13 are controlled to generate the simulating signals accordingly, or to receive the detected signals; or the measured detected signals are verified for safety control. Hence, the program is functioned as follows:

(a) The program directly controls the programmable signal S/D device 13 to generate and output the simulating signals accordingly.

(b) The program directly controls the programmable signal S/D device 13 to receive and measure the detected signals for obtaining measured data.

(c) The program directly interchanges information with the control modules of the engineered safety feature instruments through the communication network 15. After obtaining detected signals from the control modules of the engineered safety feature instruments, the detected signals are certified to judge whether statuses of the control modules are correct according to the simulating signals inputted into the control modules.

The communication network 15 is a media, where the control devices cabinet 11, the simulation C/V device communicate through the communication network 15. The communication network 15 is a ring network, where every node on the communication network 15 interchanges information with each other through the communication network 15. Thus, with the above structure, a novel system of testing engineered safety feature instruments 1 is obtained.

The present inventions simulates different input signals for control modules of engineered safety feature instruments and then detects outputs of the control modules to verify the control modules. The present invention automatically tests the engineered safety feature instruments with a simple design, where human errors are decreased, test schedule is simplified, test reliability is enhanced and human resource for testing is reduced.

Figure 2:
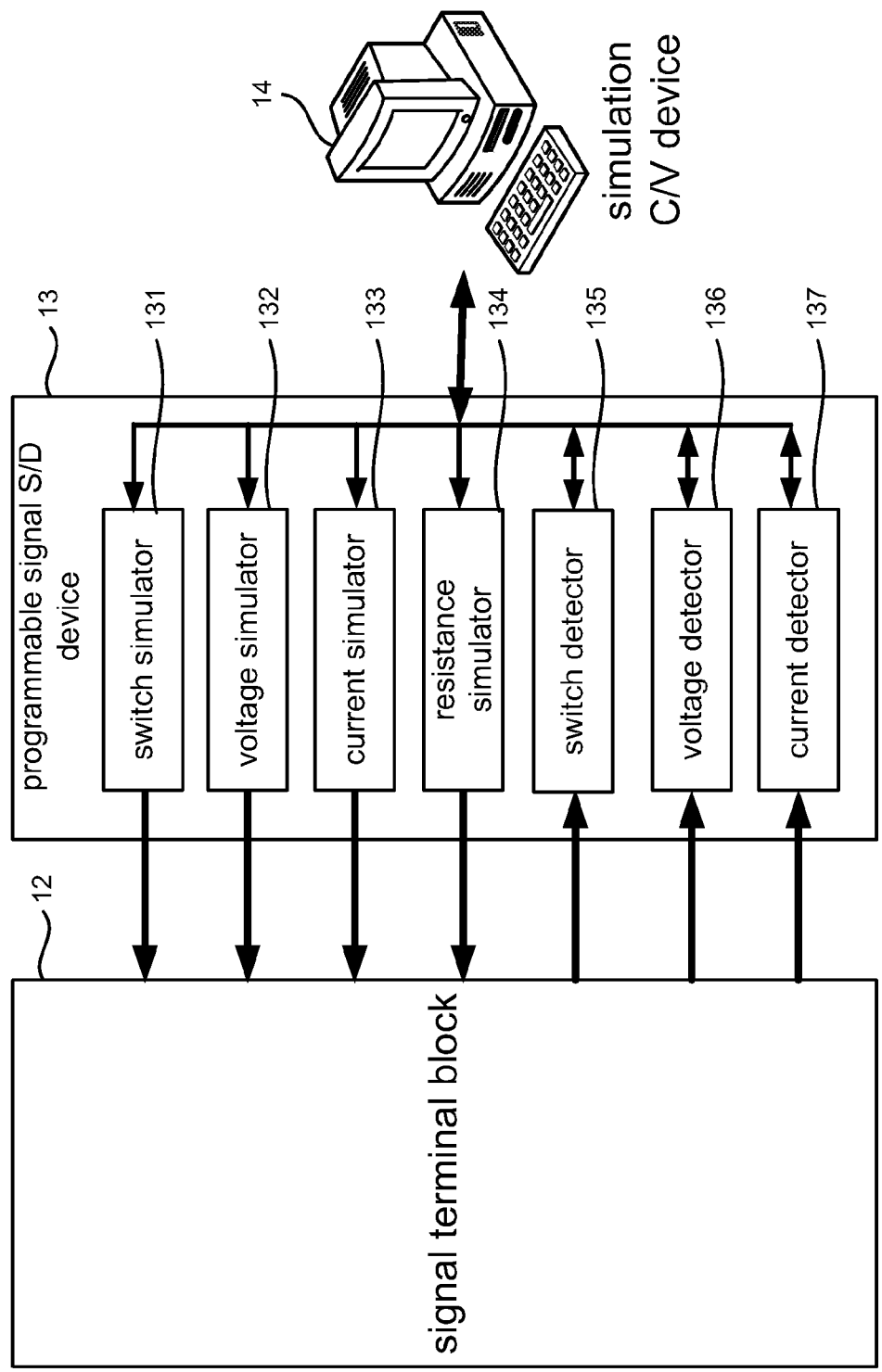
FIG. 2 is the structural view showing the programmable signal S/D device.

Please refer to FIG. 2, which is a structural view showing a programmable signal S/D device. As shown in the figure, a programmable signal S/D device 13 comprises two set of components, which are a set of signal simulating components and a set of signal detecting components. The signal simulating components comprises a switch simulator 131, a voltage simulator 132, a current simulator 133 and a resistance simulator 134. This set of simulators generates corresponding simulating signals as inputs for control modules of engineered safety feature instruments. Therein, the switch simulator 131 simulates switch-on and switch-off signals; the voltage simulator 132 simulates various voltage signals; the current simulator 133 simulates various current signals; and, the resistance simulator 134 simulates various resistance signals.

The signal detecting components comprises a switch detector 135, a voltage detector 136 and a current detector 137. This set of detectors receives corresponding detected signals from outputs of the control modules. Therein, the switch detector 135 receives signals showing statuses of switches of outside devices, each of which can be a switching-on status or a switching-off status; the voltage detector 136 receives voltage signals; and, the current detector 137 receives current signals.

Figure 3:
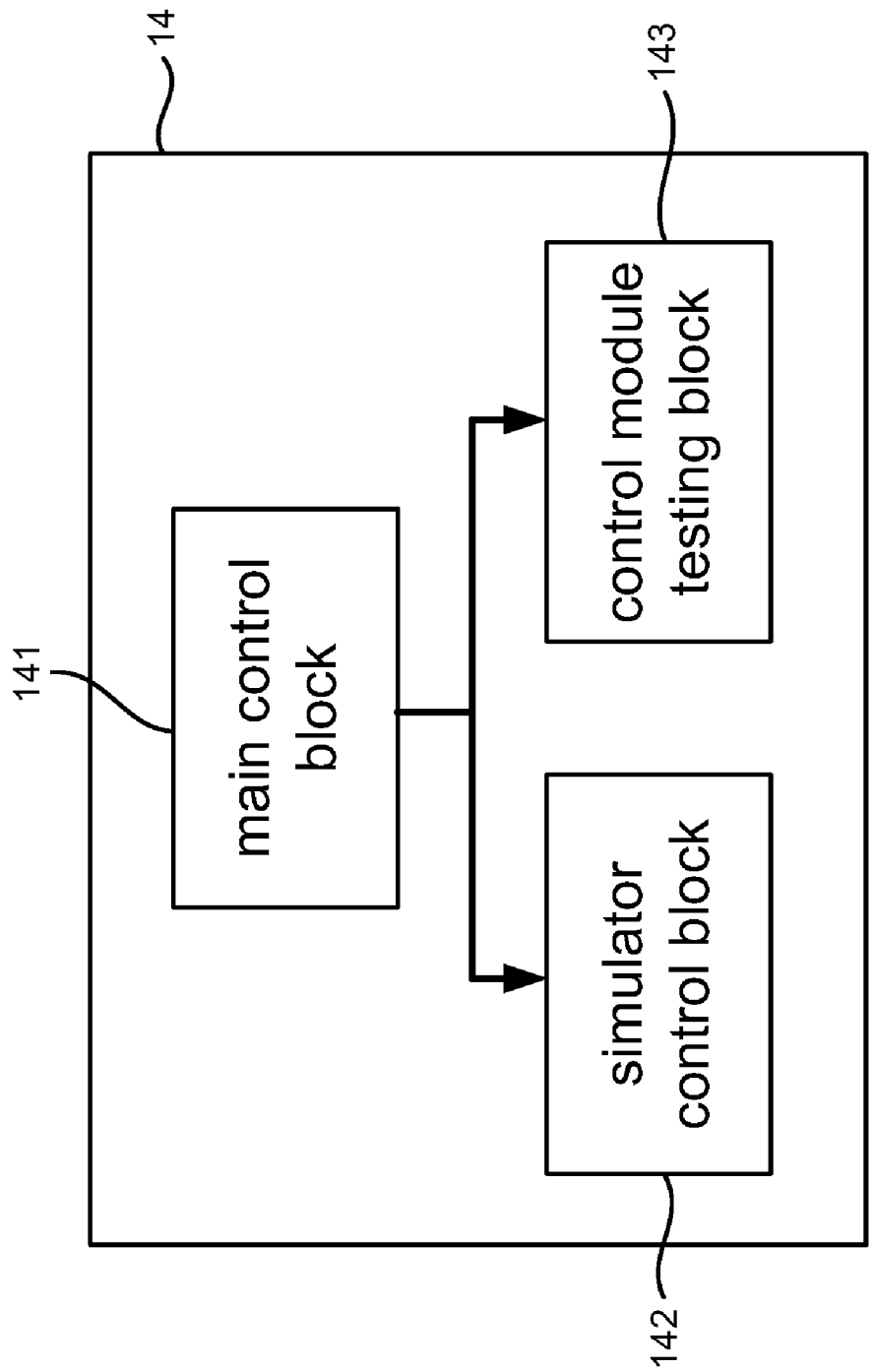
FIG. 3 is the view showing the program blocks of the simulation C/V device.

Please refer to FIG. 3, which is a view showing program blocks of a simulation C/V device. As shown in the figures, a simulation C/V device 14 has a program comprising blocks of a main control block 141, a simulator control block 142 and a control module testing block 143. The main control block 141 dominates a whole flow of automatic tests; and controls actions of the simulator control block 142 and the control module testing block 143. The simulator control block 142 sends control signals to a programmable signal S/D device for generating simulating signals and receiving detected signals. The control module testing block 143 interchanges information with control devices cabinet for obtaining simulating signals to be inputted into the control modules; receives detected signals outputted from the control modules; and verifies the detected signals according to the simulating signals to certify the control modules.

Thus, the present invention is a system automatically testing control modules of engineered safety feature instruments. The test is done before storing or operating the control modules with human resource and cost saved. The present invention effectively tests the control modules in a limited time to certify the control modules with testing speed enhanced and safety of the control modules confirmed.

To sum up, the present invention is a system of testing engineered safety feature instruments, where control modules of engineered safety feature instruments are tested automatically before storing or operating for enhancing testing speed and confirming safety of the control modules.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A system of testing engineered safety feature instruments, comprising:
    a control devices cabinet, said control devices cabinet holding a plurality of engineered safety feature instruments, said control devices cabinet comprising a communication module and a plurality of control modules;
    a signal terminal block, said signal terminal block being a transit terminal to relay input/output signals of hard points of said control modules;
    a programmable signal simulating and detecting (S/D) device, said programmable signal S/D device generating specific simulating signals and receiving specific detected signals;
    a simulation controlling and verifying (C/V) device, said simulation C/V device controlling said programmable signal S/D device to generate said simulating signals and receive said detected signals, said simulation C/V device verifying said detected signals, wherein said simulation C/V device directly interchanges information with said control modules to obtain detected signals from said control modules to certify whether statuses of said control modules are correct according to said simulating signals inputted into said control modules; and
    a communication network, said communication network being a ring network, said communication network being a media on which said control modules of engineered safety feature instruments communicate,
    wherein said control devices cabinet, said programmable signal S/D device and said simulation C/V device communicate through said communication network;
    wherein each control module is a node on said communication network; and
    wherein every node on said communication network interchanges information with each other through said communication network.

2. The system according to claim 1,
    wherein said communication module provides a communication interface between said control modules and said communication network.

3. The system according to claim 1,
    wherein said control module has an independent control circuit to provide logic control of signals.

4. The system according to claim 1,
    wherein said signal terminal block is a hardware terminal block.

5. The system according to claim 1,
    wherein signals are relayed by said signal terminal block to connect to inputs of said control modules.

6. The system according to claim 1,
wherein signals are outputted from said control modules to be directly sent through said signal terminal block to be source signals driving outside devices.

7. The system according to claim 1,
wherein each of said simulating signals and said detected signals in said programmable signal S/D device is selected from a group consisting of a current, a voltage and a resistance.

8. The system according to claim 1,
wherein each of said simulating signals and said detected signals in said programmable signal S/D device is selected from a group consisting of a switch-on signal and a switch-off signal.

9. The system according to claim 1,
wherein said simulation C/V device directly controls said programmable signal S/D device to generate and output said simulating signals accordingly.

10. The system according to claim 1,
wherein said simulation C/V device directly controls said programmable signal S/D device to receive and measure said detected signals.

11. The system according to claim 1,
wherein said programmable signal S/D device has a set of signal simulating components, comprising:
a switch simulator, said switch simulator simulating switch-on signals and switching-off signals;
a voltage simulator simulating various voltage signals;
a current simulator simulating various current signals; and
a resistance simulator simulating various resistance signals.

12. The system according to claim 1,
wherein said programmable signal S/D device has a set of signal detecting components, comprising:
a switch detector, said switch detector receiving signals showing statuses of switches of outside devices, each status being selected from a group consisting of a switching-on status and a switching-off status;
a voltage detector, said voltage detector receiving voltage signals; and
a current detector, said current detector receiving current signals.

13. A system of testing engineered safety feature instruments, comprising:
a control devices cabinet, said control devices cabinet holding a plurality of engineered safety feature instruments, said control devices cabinet comprising a communication module and a plurality of control modules;
a signal terminal block, said signal terminal block being a transit terminal to relay input/output signals of hard points of said control modules;
a programmable signal simulating and detecting (S/D) device, said programmable signal S/D device generating specific simulating signals and receiving specific detected signals;
a simulation controlling and verifying (C/V) device, said simulation C/V device controlling said programmable signal S/D device to generate said simulating signals and receive said detected signals, said simulation C/V device verifying said detected signals; and
a communication network, said communication network being a ring network, said communication network being a media on which said control modules of engineered safety feature instruments communicate,
wherein said control devices cabinet, said programmable signal S/D device and said simulation C/V device communicate through said communication network;
wherein each control module is a node on said communication network; and
wherein every node on said communication network interchanges information with each other through said communication network,
wherein programs in said simulation C/V device is divided into a main control block, a simulator control block and a control module testing block.

14. The system according to claim 13,
wherein said main control block dominates a whole flow of automatic tests; and
wherein said main control block controls actions of said simulator control block and said control module testing block.

15. The system according to claim 13,
wherein said simulator control block sends control signals to a programmable signal S/D device to generate said simulating signals and receive said detected signals.

16. The system according to claim 13,
wherein said control module testing block interchanges information with control modules of engineered safety feature instruments to obtain simulating signals to be inputted into said control modules; receives detected signals outputted from said control modules; and verifies said detected signals according to said simulating signals to certify said control modules.

* * * * *